Feb. 16, 1954 — I. V. BRUMBAUGH — 2,669,011

METHOD OF MAKING VALVES

Filed Sept. 24, 1948 — 2 Sheets-Sheet 1

INVENTOR.
I. V. BRUMBAUGH
BY
Jerome R. Cox
ATTORNEY

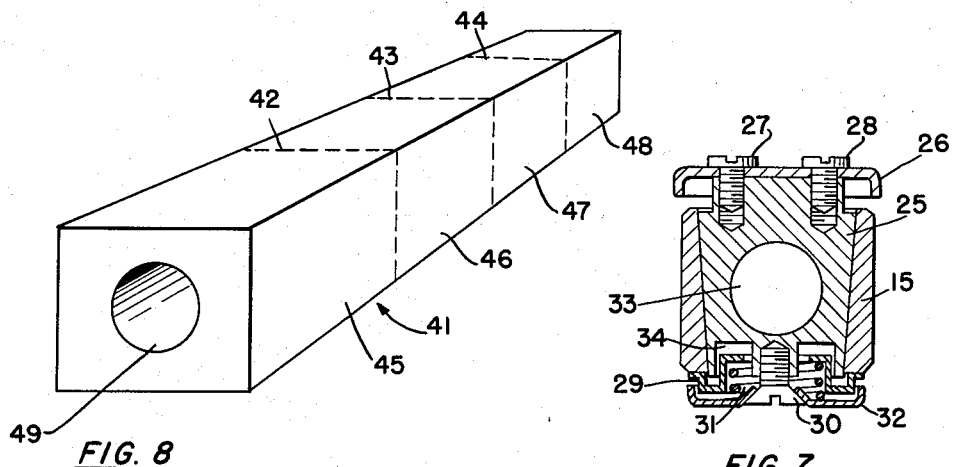
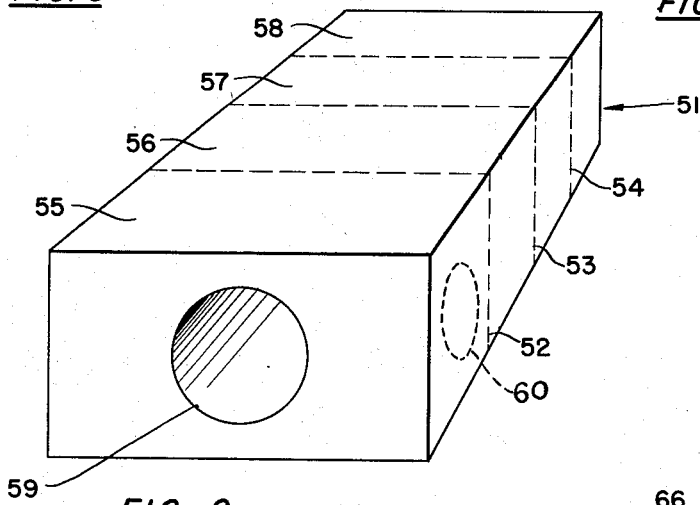
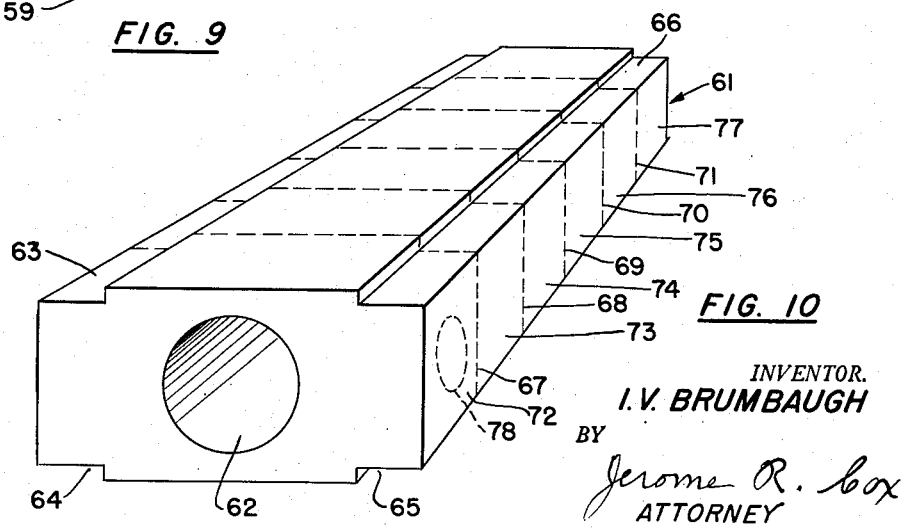

Patented Feb. 16, 1954

2,669,011

UNITED STATES PATENT OFFICE 2,669,011

METHOD OF MAKING VALVES

Isaac Vernon Brumbaugh, Clayton, Mo.

Application September 24, 1948, Serial No. 50,899

2 Claims. (Cl. 29—157.1)

Inventions described in this application relate to processes and methods of making valves. The valves disclosed and described herein (in illustration of the processes of making them) are specially designed for use in controlling the supply of gas to gas furnace burners, but it is to be understood that the inventions involved relate to the making of valves which have other uses. Thus, the inventions involved may also be useful in the formation of valves for the control of gas oven burners. They may also be used in the production of valves to control gas in other fields such as, for example, in the various types of gas cooking and heating appliances. They may be even used for the production of valves for the control of other fluids including liquids as well as gases.

This application is a continuation in part of my copending, earlier filed, application Serial No. 41,099, filed July 28, 1948. The design of one of the valves which can be produced by the process disclosed and claimed herein is shown in Design Patent 160,365. The valves illustrated are especially designed for manual main control valves for gas heating appliances. Such valves are commonly known as "A" valves. Ordinarily heretofore, valves of this type have been manufactured from castings which are formed in the approximate shape and size of the completed valve and are thereafter machined as may be desired. Castings are notoriously weak and accordingly valves made from castings are usually made extremely heavy in order to avoid the difficulties which may be occasioned by weakness or faults in the castings.

One of the objects of my invention is the provision of processes which are efficient and economical for the manufacture of relatively light and compact valves.

Further objects and features of my invention will be apparent from the subjoined specification and claims when considered in connection with the accompanying drawings illustrating several embodiments of my invention.

In the drawings:

Fig. 7 is a view in vertical section taken substantially on the lines 7—7 of Fig. 5;

Fig. 8 is a view in perspective corresponding substantially to Fig. 1 but showing a tubular bar of extruded metal;

Fig. 9 is a view in perspective of another tubular bar of extruded metal in which the opening through the tubular bar is intended to form the plug bore of the finished valve; and Fig. 10 is a view in perspective of a tubular bar of extruded metal of a different shape and dimensions in which the opening through the bar is intended to form the plug bore of the finished valves.

Figures 1, 2:
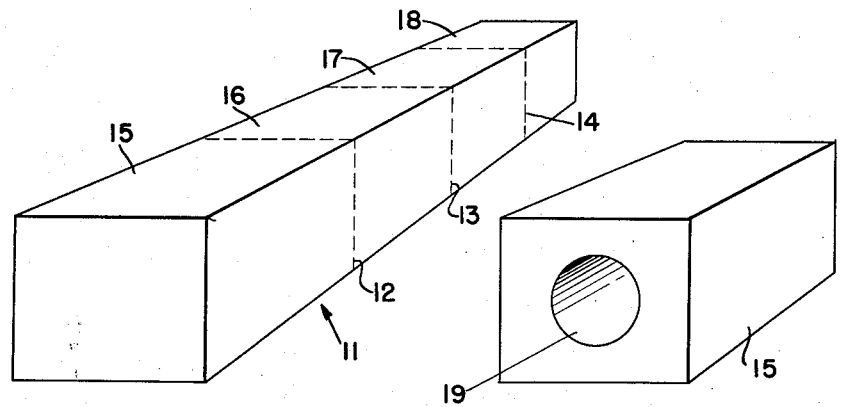
Fig. 1 is a view in perspective of a bar of extruded metal having dotted lines to indicate the planes along which the valve blocks will be severed from the bar.
Fig. 2 is a view in perspective of one of the blocks of metal after it has been cut off from the bar of Fig. 1 and after a gas passageway has been bored longitudinally through the block.
Figures 3, 4:
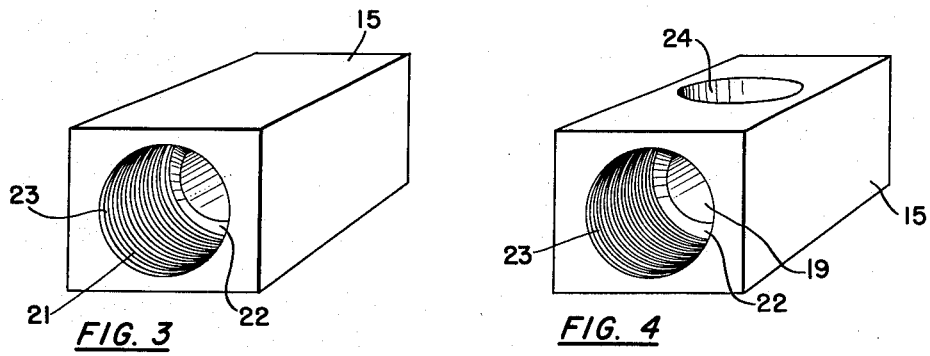
Fig. 3 is a view in perspective of a block similar to that shown in Fig. 2 in which the ends of the bore have been enlarged and tapped.
Fig. 4 is a view in perspective of a block similar to the blocks shown in Figs. 2 and 3 in which a tapered plug bore has been formed transversely through the block to intersect the gas passageway.
Figures 5, 6:
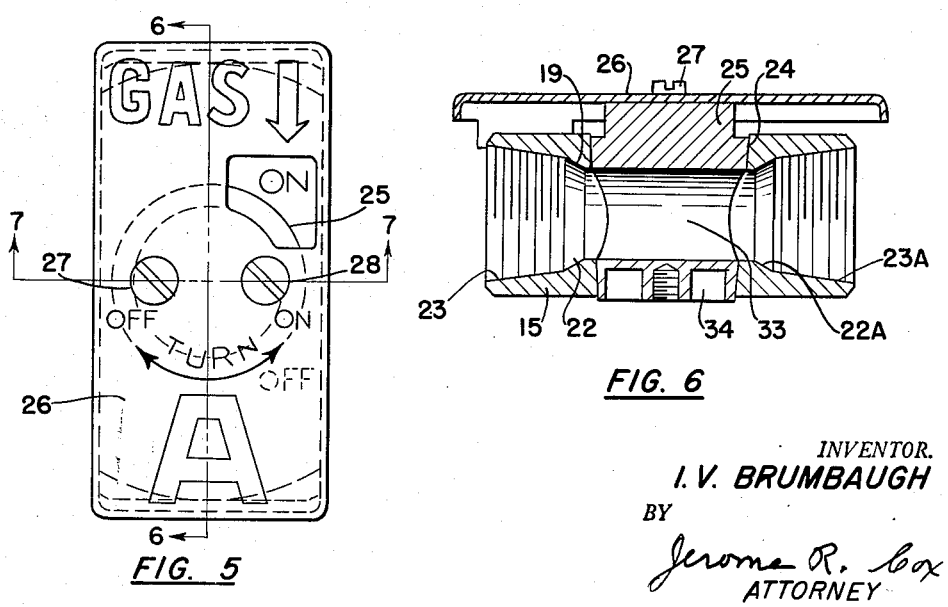
Fig. 5 is a view in plan of a valve completed according to my process.
Fig. 6 is a view in vertical section taken substantially on the lines 6—6 of Fig. 5.

I refer now especially to Figs. 1 to 4 inclusive for a more detailed description of the process of forming valves such as the valve shown in Figs. 5, 6, and 7. I prefer to start with a solid bar of extruded metal such as the bar shown at 11, in Fig. 1. The bar may be of any desired metal or alloy such as, for example, brass, steel, aluminum, etc. The first operation according to my preferred process is to cut the bar of metal (which is preferably extruded metal and therefore relatively strong and free from faults) as along the lines, 12, 13, 14 etc. to form blocks such as 15, 16, 17 and 18 etc. The end of each block (as for example the block 15) is next bored lengthwise as shown in Fig. 2 to form a longitudinally extending bore 19, which will serve as a gas passage in the completed valve. The block 15 is then machined at its end, as for example at 21, so that the end of the passageway 19 is enlarged as shown and a bevelled or inclined surface 22 is formed. The outer end of the bore is then tapped as at 23 for the reception of an end fitting. The other end of the block 15 is similarly machined. Thereafter the valve body which comprises the block 15 is bored transversely to the bore 19 to form a plug bore which intersects with the bore 19 at right angles. Thereafter, a valve plug (such as valve plug 25 shown in Figs. 6 and 7) or some other suitable type of valve plug is inserted in the plug bore. If desired, a handle, screws, washers and spring are added. For example, the completed valve shown in Figs. 5, 6 and 7 comprises (a) a body 15 formed with a longitudinally extending gas passage 19 with bevelled portions 22 and 22a, with threaded portions 23 and 23a and with a plug bore 24, (b) the plug 25, (c) a handle 26, (d) screws 27 and 28 (by which the handle 26 is secured to the plug 25 as shown in Fig. 7), (e) a bridging member 29, (f) a spring 31, (g) a spring washer 32, and (h) a spring washer retaining screw 30. The plug is formed with a gas passageway bore 33 and with an annular recess 34 in which the bridging washer 29 and the spring 31 are seated. The plug is also formed with threaded holes into which the screws 27, 28 and 30 are threaded and secured. The bridging washer 29 bears on the surface of the body 15 outside of the plug 25 and (through the spring 31, the spring washer 32, and the screw 30) urges the plug 25 into sealing contact with the plug bore in the body 15 and thus insures a permanent seal. The handle 26 is secured to the plug 25 by the screws 27 and 28 and may be secured either before or after the plug is inserted in the bore 24. After the plug has been inserted in the bore, the bridging member 29, the spring 31, the washer 32, and the screw 33 are secured in place to maintain the valve parts in operative assembled condition.

An alternative process is partially illustrated in Fig. 8. In performing such alternative process, the metal is extruded in the form of a tubular bar which may be rectangular in cross section such, for example, as is shown at 41 in Fig. 8. This bar is to be cut along the dotted lines 42, 43 and 44 to form blocks 45, 46 and 47 and 48, etc. As may be seen this bar is rectangular in shape and is formed with a longitudinally extending bore 49 which forms the gas passageway for the valve. The tubular rectangular blocks 45, 46, 47, 48, etc. are machined to form the enlarged and threaded end portions similar to the portions 21 shown in Fig. 3. Thereafter the blocks are bored to form a tapered plug bore such as is shown at 24 in Fig. 4 and thereafter the valve plug is inserted in any desired manner, as for example, as shown in Figs. 5, 6, and 7.

A further alternative process is shown in Fig. 9. Therein a rectangular bar of tubular metal 51 is extruded in the shape shown. However, it must be noticed that this bar 51 is not only of greater height than the bar 11 but also is much wider, it being understood that the distance between the cutoff lines in Fig. 9 corresponds substantially to the height of the bar 11; that the height of the bar 51 corresponds to the width of the bar 11; and the width of the bar 51 corresponds substantially to the length of the block 15. The cut-off lines are shown at 52, 53, 54, etc., and the individual blocks are indicated at 55, 56, 57, 58, etc. The opening 59 which extends through each of the blocks is a preliminary bore which will eventually form the plug bore of the completed valve. After the blocks which will form the valves are severed a transverse bore is formed lengthwise through each block as indicated in dotted lines at 60. This is enlarged adjacent to its ends and is threaded for the reception of end fittings. The bore 59 is machined to form a tapered bore for the reception of the plug and the plug is inserted as suggested above in connection with the previously described embodiments.

A slightly different process is illustrated in Fig. 10. Therein, a tubular bar of extruded metal 61 is formed with a hollow 62 extending lengthwise thereof and with notches as shown at 63, 64, 65, and 66. The bar is to be severed as along the lines 67, 68, 69, 70 and 71 to form valve blocks 72, 73, 74, 75, 76 and 77. These blocks are then bored lengthwise as indicated by the dotted circle at 78 to form a gas passageway bore. Thereafter the blocks are machined to enlarge the ends of the gas passageway bore and to thread the ends for the reception of appropriate fittings. The bore 62 of each of the blocks is machined to form a tapered plug bore. Thereafter, the valve is assembled by the insertion of the valve plug in the plug bore 62, as described above in connection with Figures 1-9 inclusive.

The processes illustrated in Figs. 9 and 10 may be modified if desired by using solid bars of the shapes shown therein without the bores 59 and 62; cutting off blocks of appropriate lengths, as for example, on the lines 52, 53, 54, etc., and on the lines 67, 68, 69, 70, 71, etc.; and then machining the bores 59 and 62 as well as performing the other machining operations specified.

It is to be understood that the above described embodiments of the processes of my invention are for the purpose of illustration only and various changes may be made therein without departing from the spirit and scope of the invention.

I claim:

1. A method of making valves which comprises extruding a bar of metal of a shape having in cross section a four straight sided figure of which at least two of the sides are parallel; cutting said bar into appropriate lengths to form valve bodies; forming a passageway in each body longitudinally thereof; forming a tapered bore in an intermediate portion of said body intersecting said passageway and with an axis substantially perpendicular to said passageway for the reception of a valve plug without altering the external shape of said bar of metal so that the valve body has in cross section a four straight sided figure of which at least the top and bottom sides are parallel and to which the axis of said tapered bore is perpendicular; and inserting a valve plug in said tapered bore.

2. A method of making valves which comprises forming from an extruded bar of metal of a shape having in cross section a four straight sided figure of which at least the top and bottom faces are parallel plane surfaces, a block of metal of like shape and of an appropriate length to form a valve body and having a passageway extending longitudinally thereof parallel to said top and bottom faces; machining a tapered bore in an intermediate portion of said body intersecting said passageway, and with an axis substantially perpendicular to said passageway for the reception of a valve plug without altering the external shape of said block of metal so that the completed valve body has in cross section a four straight sided figure identical with the cross section of the extruded bar, said valve body having at least the top and bottom faces plane surfaces parallel to each other and the axis of said tapered bore perpendicular thereto; and inserting a valve plug in said tapered bore.

ISAAC VERNON BRUMBAUGH.

References Cited in the file of this patent

UNITED STATES PATENTS

| Number | Name | Date |
|---|---|---|
| 924,005 | Schwieger | June 8, 1909 |
| 1,943,708 | Werder | Jan. 16, 1934 |
| 1,956,554 | Baldwin | May 1, 1934 |
| 1,972,821 | Weatherhead | Sept. 4, 1934 |
| 2,309,666 | Parker | Feb. 2, 1943 |
| 2,446,496 | Tautz | Aug. 3, 1948 |